US012516204B2

(12) United States Patent
Casarrubias et al.

(10) Patent No.: US 12,516,204 B2
(45) Date of Patent: Jan. 6, 2026

(54) PRINTING SYSTEM

(71) Applicants: Dow Global Technologies LLC, Midland, MI (US); Rohm and Haas Company, Collegeville, PA (US)

(72) Inventors: Juan Carlos Casarrubias, Mexico City (MX); Jorge C. Gomes, Sao Paulo (BR); Nicolas C. Mazzola, Pearland, TX (US); Mateus Batista Torres Cipro, Sao Paulo (BR); Jie Wu, Lake Jackson, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 531 days.

(21) Appl. No.: 17/905,767

(22) PCT Filed: Mar. 1, 2021

(86) PCT No.: PCT/US2021/020221
§ 371 (c)(1),
(2) Date: Sep. 7, 2022

(87) PCT Pub. No.: WO2021/206825
PCT Pub. Date: Oct. 14, 2021

(65) Prior Publication Data
US 2023/0111335 A1   Apr. 13, 2023

Related U.S. Application Data

(60) Provisional application No. 63/006,763, filed on Apr. 8, 2020.

(51) Int. Cl.
*C09D 11/108* (2014.01)
*C09D 11/03* (2014.01)
*C09D 175/04* (2006.01)

(52) U.S. Cl.
CPC ............ *C09D 11/108* (2013.01); *C09D 11/03* (2013.01); *C09D 175/04* (2013.01)

(58) Field of Classification Search
CPC ...... C09D 11/108; C09D 11/03; C09D 175/04
See application file for complete search history.

(56) References Cited

U.S. PATENT DOCUMENTS

| 5,520,963 A * | 5/1996 | Liu ...................... C09D 175/04 |
| | | 427/388.1 |
| 9,682,586 B2 | 6/2017 | Lubnin et al. |
| 10,017,600 B2 | 7/2018 | Casarrubias et al. |
| 11,135,817 B2 | 10/2021 | Casarrubias et al. |
| 11,193,031 B2 | 12/2021 | Pujari et al. |
| 2004/0197572 A1 | 10/2004 | Bell |
| 2014/0037917 A1 | 2/2014 | Branch et al. |
| 2016/0145465 A1 | 5/2016 | Furutaka et al. |
| 2018/0043718 A1 | 2/2018 | Masubuchi et al. |
| 2018/0079880 A1 | 3/2018 | Miyake et al. |
| 2021/0246275 A1 | 8/2021 | Casarrubias et al. |
| 2021/0369625 A1 | 12/2021 | Ishikawa et al. |

FOREIGN PATENT DOCUMENTS

| GB | 2025987 A | 1/1980 | |
| JP | H03-220264 A | 9/1991 | |
| WO | WO-2011070685 A1 * | 6/2011 | ........... C09D 11/104 |
| WO | 2016/196168 A1 | 12/2016 | |
| WO | WO-2020041233 A1 * | 2/2020 | ......... B29C 48/0018 |
| WO | WO-2020127439 A1 * | 6/2020 | ......... C08G 18/0852 |

OTHER PUBLICATIONS

PCT/US2021/020221, International Search Report and Written Opinion with a mailing date of Jun. 18, 2021.
PCT/US2021/020221, International Preliminary Report on Patentability with a mailing date of Oct. 20, 2022.

* cited by examiner

*Primary Examiner* — Robert S Walters, Jr.
(74) *Attorney, Agent, or Firm* — Boyle Fredrickson S.C.

(57) ABSTRACT

A process for producing a coated, printed substrate comprising (a) providing a printed substrate, wherein the substrate comprises a surface on which resides one or more areas of a layer of an ink, (b) bringing together a component A and a component B to form a urethane coating composition, wherein component A comprises a polyisocyanate prepolymer A1, wherein the polyisocyanate prepolymer A1 is a reaction product of a polyisocyanate monomer A1a and an isocyanate-polyreactive compound A1b, wherein component B comprises one or more polyol B1, wherein the urethane coating composition has isocyanate index greater than 0.9, (c) applying a layer of the urethane coating composition to the surface. Also provided is a coated printed substrate made by such a method.

14 Claims, No Drawings

PRINTING SYSTEM

It is often desired to use printing ink to create an image on a plastic surface. Usually, it is desirable to then protect the printed surface. Without protection, the image is vulnerable to damage, for example by scratching, which may occur during transportation or handling, and/or by distortion when the printed surface is heated, for example during a sealing operation. In the past, it has been common to protect the printed image by attaching a covering clear plastic film to the printed surface, usually by lamination. Such laminates often have one or more of the following undesirable features: added complexity in the manufacturing process, or added cost.

WO 2016/196168 describes a coated film, where the film comprises polyethylene and the coating comprises polyurethane.

It is desired to provide a method of making a coated printed substrate that has one or more of the following advantages: good appearance, good abrasion resistance, good resistance to high temperatures, and/or good resistance to chemicals. Preferably, the coated printed substrate has one or more of these advantages to sufficient degree that it is not necessary to attach a covering plastic layer to the coated surface.

The following is a statement of the invention.

A first aspect of the present invention is a process for producing a coated, printed substrate comprising
- (a) providing a printed substrate, wherein the substrate comprises a surface on which resides one or more areas of a layer of an ink, wherein the ink comprises
  - (i) one or more olefin copolymers, and
  - (ii) one or more appearance additive selected from one or more pigments, one or more dyes, and mixtures thereof, and
  - (iii) one or more conductivity additives,
- (b) bringing together a component A and a component B to form a urethane coating composition,
  - wherein component A comprises a polyisocyanate prepolymer A1, wherein the polyisocyanate prepolymer A1 is a reaction product of a polyisocyanate monomer A1a and an isocyanate-polyreactive compound A1b,
  - wherein component B comprises one or more polyol B1,
  - wherein the urethane coating composition has isocyanate index greater than 0.9, and
- (c) applying a layer of the urethane coating composition to the surface.

A second aspect of the present invention is a coated printed substrate made by the method of the first aspect of the present invention.

The following is a detailed description of the invention.

As used herein, the following terms have the designated definitions, unless the context clearly indicates otherwise.

As used herein, "polymer" and "plastic" are synonymous. A polymer is a molecule made of many repeat units. There may be more than one type of repeat unit; that is, polymer may be a homopolymer (exactly one type of repeat unit) or a copolymer (more than one type of repeat unit). A polymer has molecular weight of 5,000 or greater. A polymer may be linear, branched, crosslinked, or any combination thereof.

A polyolefin is a polymer in which 75% or more by weight, based on the weight of the polymer, of the repeat units have structure I:

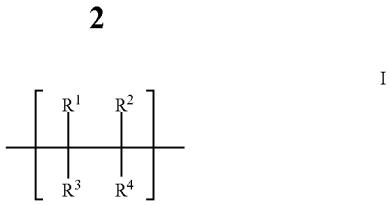

where each of $R^1$, $R^2$, $R^3$, and $R^4$ is independently hydrogen or an olefin group. Any one of $R^1$, $R^2$, $R^3$, and $R^4$ may be the same as or different from any of the others of $R^1$, $R^2$, $R^3$, and $R^4$. Any two or more of $R^1$, $R^2$, $R^3$, and $R^4$ may be joined together to form a cyclic structure.

Polyethylene is a polymer in which 75% or more by weight, based on the weight of the polymer, of repeat units have structure II ("ethylene units")

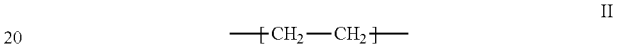

As used herein, an olefin copolymer is a polymer that has repeat units of structure I and also has repeat units that contain one or more oxygen atom. Suitable oxygen-containing repeat units include, for example, acrylic units (structure III), ester units (structure IV), and carbonyl units (structure V):

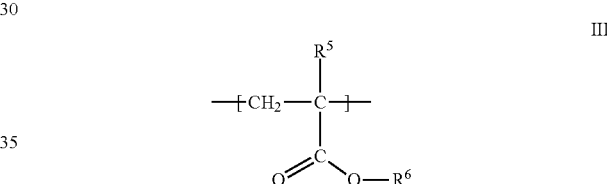

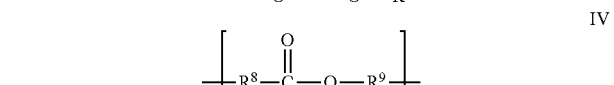

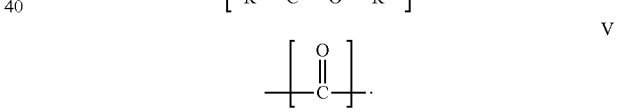

$R^5$ is methyl or hydrogen, and $R^6$ is a hydrogen or is a substituted or unsubstituted alkyl group. $R^8$ and $R^9$ are each, independently of each other, a substituted or unsubstituted alkyl group. Suitable substituents include hydroxyl groups, carboxyl groups, nitrogen-containing groups, groups containing carbon-carbon double bonds, other substituents, and combinations thereof. In an olefin copolymer, the repeat units of structure I and the one or more oxygen-containing repeat units may be arranged in the copolymer in any order, including, for example, random, alternating, blocks, branches, or any combination thereof. In an olefin copolymer, 75% or more of the repeat units, by weight, based on the weight of the polymer, are either structure I or an oxygen-containing repeat unit.

As used herein, an isocyanate-reactive group is a chemical group that is capable of reacting with in isocyanate group to form a covalent bond between the isocyanate group and the isocyanate-reactive group. An intact isocyanate group is an isocyanate group that has not reacted with an isocyanate-reactive group. An intact isocyanate-reactive group is an isocyanate-reactive group that has not reacted with an isocyanate group.

A compound having one or more isocyanate-reactive groups is characterized by the functionality, which is the number of isocyanate-reactive groups per molecule. In a mixture of compounds each having one or more isocyanate-reactive groups per molecule, the functionality of the mixture is the number average functionality. Similarly, a compound having one or more isocyanate groups is characterized by the functionality, which is the number of isocyanate groups per molecule. In a mixture of compounds each having one or more isocyanate groups per molecule, the functionality of the mixture is the number average functionality.

A compound having isocyanate-reactive groups and having functionality of 2 or higher is known herein as an "isocyanate-polyreactive" compound.

A polyol is a compound that has two or more hydroxyl groups. A polyol having two or more ether linkages is a polyether polyol. A polyol having two or more ester linkages is a polyester polyol. A polyol having two or more urethane linkages is a polyurethane polyol. A polyol having two or more carbonate linkages is a polycarbonate polyol. A polyol having two or more residues of a ring-opening polymerization reaction of epsilon-caprolactone is a polycaprolactone polyol. A polyol may be characterized by the "OH number," as determined by the test ASTM D4274-16 (American Society of Testing and Materials, Conshohocken, PA, USA). A low molecular weight polyol has molecular weight of 300 or lower.

A composition that contains intact isocyanate groups may be characterized by the "isocyanate index," which is the ratio of the number of all intact isocyanate groups in the composition to the number of all intact isocyanate-reactive groups in the composition. A composition that contains intact isocyanate groups may also be characterized by the "NCO content," which is the weight percentage of isocyanate groups, based on the weight of the composition, as determined by the test ASTM D2572-19 (American Society of Testing and Materials, Conshohocken, PA, USA). If the composition contains solvent, the NCO content may be reported either as "with solvent," meaning that the NCO content percentage is based on the weight of the entire composition, or the NCO content may be reported as "without solvent," meaning that the NCO content percentage is based on the weight of the non-solvent portion of the composition.

A compound containing one or more isocyanate groups per molecule is an isocyanate. A compound containing two or more isocyanate groups per molecule is a polyisocyanate. An isocyanate having one or more aromatic rings in the molecule is an aromatic isocyanate. An isocyanate having no aromatic rings in the molecule is an aliphatic isocyanate. A polyisocyanate monomer is a polyisocyanate having molecular weight of 700 or lower.

As used herein a solvent is a compound that is liquid over a temperature range that includes the range of 10° C. to 30° C. and that does not participate in the chemical reaction between isocyanate groups and isocyanate-reactive groups. A solvent has boiling point of 200° C. or lower.

As used herein, a fatty compound is a compound that contains a linear hydrocarbon group having 8 or more carbon atoms bonded to each other in a line. A fatty compound that contains a carboxyl group or carboxylate anion is a fatty acid. A fatty compound that contains a hydroxyl group is a fatty alcohol.

As used herein, a fatty triglyceride is compound that has the structure of a triester of glycerol with three fatty acids. The portion of fatty triglyceride that would have been derived from one of the fatty acids (if the fatty triglyceride had been formed by an esterification reaction between the fatty acids and glycerol) is known as a fatty acid residue. As used herein, a natural oil polyol is a fatty triglyceride that has two or more hydroxyl groups.

As used herein, a wax ester is a compound that has the structure of an ester of a fatty acid and a fatty alcohol and that is solid over a temperature range that includes the range of 10° C. to 40° C. A mixture of wax esters is also referred to herein as a wax ester. Also included in the term "wax ester" are mixtures in which 80% or more by weight of the ingredients consists of one or more wax esters, while the remaining 20% or less by weight consists of substances that are not wax esters.

As used herein, a printed surface is a surface on which resides one or more area of printing ink. On the printed surface, the printing ink is dry, which means that the printing ink contains, by weight based on the weight of the printing ink, 10% or less of all compounds having boiling point of 120° C. or below. Printing ink contains 15% or more by weight based on the weight of the printing ink, one or more olefin copolymer. Printing ink also contains one or more pigments, one or more dyes, or a mixture thereof. digital printing ink also contains one or more conductivity additives. Conductivity additives are also known as charge directors or imaging agents. Conductivity additives increase the electrical conductivity of the ink.

As used herein, the wettability of a surface refers to the tendency for a liquid that is placed on the surface to form a thin, extended layer rather than to form a rounded, localized bead. The greater the tendency of such liquids to form a thin extended layer rather than a rounded localized bead, the better the wettability is considered to be herein. Specifically, herein, the class of liquids used for assessing wettability is the class of liquids that contain 50% or more by weight of one or more hydrocarbon compounds and that also contain (i) one or more ethylene copolymers, (ii) one or more appearance additive selected from one or more pigments, one or more dyes, and mixtures thereof, and (iii) one or more imaging agent.

As used herein, TDI is toluene diisocyanate, and MDI is diphenylmethane diisocyanate.

The present invention involves a coating composition, which is formed by bringing together a component A and a component B.

Component A contains one or more polyisocyanates. Component A preferably contains one or more prepolymer A1, which is a reaction product of one or more polyisocyanate monomer A1a and one or more isocyanate-polyreactive compound A1b. Prepolymer A1 is a polyisocyanate. Polyisocyanate monomer A1a preferably contains one or more aromatic polyisocyanate monomer, or one or more aliphatic polyisocyanate monomer, or a blend thereof. More preferably, polyisocyanate monomer A1a contains one or more aromatic polyisocyanate monomer. More preferably, polyisocyanate monomer A1a contains one or more monomer selected from 2,6-TDI; 2,4-TDI; 2,4'-MDI; 4,4'-MDI, and mixtures thereof.

The isocyanate-polyreactive compound A1b preferably contains one or more polyol. Suitable polyols for isocyanate polyreactive compound A1b include, for example, polyether polyols, polyester polyols, polyetherpolyester polyols, polyurethane polyols, polycarbonate polyols, polycaprolactone polyols, natural oil polyols, and blends thereof. Preferred polyols for isocyanate polyreactive compound A1b are polyether polyols, polyester polyols, and blends thereof. More preferred are polyether polyols, low molecular weight polyols, and blends thereof. Suitable low molecular weight polyols include, for example, ethylene glycol, diethylene glycol, triethylene glycol, propylene glycol, trimethylene glycol, 1,3-butanediol, 1,4-butanediol, 1,6-hexanediol, trimethylolpropane, triisopropanolamine, and blends thereof.

Preferably the isocyanate-polyreactive compound A1b contains one or more isocyanate-polyreactive compound having functionality of 2 or more. Preferably the isocyanate-polyreactive compound A1b contains one or more isocyanate-polyreactive compound having functionality of 6 or less; more preferably 5 or less; more preferably 4 or less.

When isocyanate-polyreactive compound A1b includes one or more polyol, preferably a polyol has molecular weight of 50 or more; more preferably 100 or more. When isocyanate-polyreactive compound A1b includes one or more polyol, preferably a polyol has molecular weight of 4000 or less; more preferably 2000 or less.

Component A may or may not contain solvent. Examples of suitable solvents are ethyl acetate, propyl acetate, cyclohexane, methyl acetate, methyl ether ketone, toluene, and mixtures thereof. Preferred solvents are ethyl acetate, propyl acetate, cyclohexane, methyl ether ketone, and mixtures thereof; more preferred are ethyl acetate, propyl acetate, cyclohexane, and mixtures thereof.

If solvent is present in component A, preferably all the ingredients of component A are dissolved in the solvent. Preferably, the amount of solvent in component A, by weight based on the weight of component A, is 20% or more, more preferably 30% or more. Preferably, the amount of solvent in component A, by weight based on the weight of component A, is 70% or less, more preferably 50% or less.

Preferably the NCO content of component A, with solvent, is 5% or more; more preferably 7% or more. Preferably the NCO content of component A, with solvent, is 15% or less; more preferably 13% or less. Preferably the NCO content of component A without solvent is 8% or more; more preferably 12% or more. Preferably the NCO content of component A without solvent is 25% or less; more preferably 22% or less.

Preferably, component A contains one or more fatty triglyceride. Preferred are fatty triglycerides in which one or more fatty acid residue has 12 or more carbon atoms, more preferably 16 or more carbon atoms. Preferred are fatty triglycerides in which one or more of the fatty acid residues has one or more carbon-carbon double bonds.

Preferably, the amount of fatty triglyceride in component A is, by weight based on the weight of component A, 0.1% or more; more preferably 0.2% or more; more preferably 0.3% or more. Preferably, component A contains one or more fatty triglyceride. Preferably, the amount of fatty triglyceride in component A is, by weight based on the weight of component A, 10% or less; more preferably 5% or less; more preferably 3% or less.

Preferably, component A contains one or more wax ester. Examples of suitable wax esters include but are not limited to cetyl palmitate, palmityl stearate, stearyl stearate, hydrogenated tallow, carnauba wax, beeswax, and mixtures thereof. Preferred are cetyl palmitate, palmityl stearate, stearyl stearate, hydrogenated tallow, and mixtures thereof. More preferred is a mixture of cetyl palmitate, palmityl stearate, stearyl stearate, and hydrogenated tallow.

Preferably, the amount of wax ester in component A is, by weight based on the weight of component A, 0.1% or more; more preferably 0.2% or more; more preferably 0.3% or more. Preferably, the amount of wax ester in component A is, by weight based on the weight of component A, 10% or less; more preferably 5% or less; more preferably 3% or less.

Component B contains one or more isocyanate-polyreactive compound B1. Preferably isocyanate-polyreactive compound B1 contains one or more polyols. Polyols suitable for inclusion in isocyanate-polyreactive compound B1 include, for example, polyether polyols, polyester polyols, polyether-polyester polyols, polyurethane polyols, polycarbonate polyols, polycaprolactone polyols, natural oil polyols, and blends thereof.

Preferably isocyanate-polyreactive compound B1 contains one or more polyurethane polyols. Polyurethane polyols suitable for use in isocyanate-polyreactive compound B1 are preferably the reaction products of one or more polyisocyanate monomer B1a and one or more polyol B1b. Polyisocyanate monomer B1a may be an aromatic polyisocyanate, an aliphatic polyisocyanate, or a blend thereof. Preferably, polyisocyanate monomer B1a contains one or more aromatic polyisocyanate monomer. Preferred polyisocyanate monomers in B1a are 2,6-TDI; 2,4-TDI; 2,2'-MDI; 2,4'-MDI; 4,4'-MDI, and mixtures thereof. Preferably, polyisocyanate monomer B1a contains one or more polyisocyanate monomer having functionality of 2 or more.

Polyols suitable for inclusion in polyol B1b include, for example, polyether polyols, polyester polyols, polyether-polyester polyols, polyurethane polyols, polycarbonate polyols, polycaprolactone polyols, natural oil polyols, and blends thereof. Preferred polyols for polyol B1b are polyether polyols, low molecular weight polyols, and blends thereof. Suitable low molecular weight polyols include, for example, ethylene glycol, diethylene glycol, triethylene glycol, propylene glycol, trimethylene glycol, 1,3-butanediol, 1,4-butanediol, 1,6-hexanediol, trimethylolpropane, triisopropanolamine, and blends thereof.

Preferably, the amount of polyurethane polyol B1PU in component B is, by weight based on the weight of component B, 20% or more; more preferably 30% or more; more preferably 49% or more. Preferably, the amount of polyurethane polymer B1PU in component B is, by weight based on the weight of component B, 95% or less; more preferably 85% or less; more preferably 75% or less. Preferably, one or more of the polyols included in polyol B1b do not react with isocyanate compound and are present in component B.

Preferably, component B comprises one or more anti-block agents. An anti-block agent reduces blocking at the surface of polymer films and other plastic articles to allow easy processing and handling of films. Anti-block agents may be inorganic or organic. Examples of inorganic anti-block agents include, but are not limited to, talc and silica. Examples of organic anti-block agents include, but are not limited to, cellulose acetate butyrate. Mixtures of anti-block agents are also suitable.

Preferably, the amount of anti-block agent in component B is, by weight based on the weight of component B, 0.05% or more; more preferably 0.1% or more; more preferably 0.2% or more. Preferably, the amount of anti-block agent in component B is, by weight based on the weight of component B, 10% or less; more preferably 5% or less; more preferably 3% or less.

Preferably, component B comprises one or wetting agents. A wetting agent improves the flow and levelling of a liquid and reduces any tendency the liquid may have to form pinholes, fisheyes, craters, mottled surface (called "orange peel"), or any combination thereof, when the liquid is applied as a layer on a surface. Examples of suitable wetting agents include, but are not limited to, acrylic polymers, siloxanes, and mixtures thereof.

Preferably, the amount of wetting agent in component B is, by weight based on the weight of component B, 0.05% or more; more preferably 0.1% or more; more preferably 0.2% or more. Preferably, the amount of wetting agent in component B is, by weight based on the weight of component B, 10% or less; more preferably 5% or less; more preferably 3% or less.

Component B may or may not contain solvent. Examples of suitable solvents are ethyl acetate, propyl acetate, cyclohexane, methyl acetate, methyl ether ketone, toluene, and mixtures thereof. Preferred solvents are ethyl acetate, propyl acetate, cyclohexane, methyl ether ketone, and mixtures thereof; more preferred are. ethyl acetate, propyl acetate, cyclohexane, and mixtures thereof If solvent is present in component B, preferably all the ingredients of component B are dissolved in the solvent. Preferably, the amount of solvent in component B, by weight based on the weight of component B, is 5% or more, more preferably 10% or more. Preferably, the amount of solvent in component B, by weight based on the weight of component B, is 80% or less, more preferably 70% or less.

In the practice of the present invention, component A and component B are brought together, and the resulting mixture is a urethane coating composition. Preferably, component A and component B are then thoroughly mixed. A layer of the coating composition as applied to a substrate. It is anticipated that the isocyanate groups in component A will react with the isocyanate-reactive groups in component B. Preferably, the layer of the coating composition is applied to the substrate at a time when 50 mole % or less of the isocyanate groups in component A have reacted with isocyanate-reactive groups in component B.

It is useful to contemplate the mixture of component A and component B, prior to any chemical reaction taking place between them. The isocyanate index of that mixture is 0.9 or greater; preferably 1.0 or greater; more preferably 1.1 or greater; more preferably 1.2 or greater. The isocyanate index of that mixture is preferably 2 or lower; more preferably 1.8 or lower; more preferably 1.6 or lower.

In the practice of the present invention, a layer of the urethane coating composition is applied to the surface of the printed substrate. Preferably, at a time after the ink has been applied to the substrate but before the layer of the urethane coating composition is applied to the substrate, the surface of the substrate is subjected to a surface treatment. Suitable surface treatments alter the surface energy of the substrate in a way that improves the wettability of the surface of the substrate. Examples of suitable surface treatments include, for example, corona treatment and plasma treatment.

Preferably, when the urethane coating composition, prior to the cure process, is a liquid at the temperature at which the urethane coating composition is applied to the substrate. Preferably, the liquid urethane coating composition, when it is applied to the printed surface of the substrate, shows good wetting, both in the areas of the substrate that are covered by printing ink and by the areas of the substrate (if any) that come into direct contact with the liquid urethane coating composition. That is, the liquid urethane coating composition preferably forms a smooth, unbroken layer over the entire covered portion of the substrate, without gaps. Such gaps are sometimes observed when a liquid coating composition withdraws from portions of the substrate surface, usually because of surface tension, to form structures like "beads" or "fish eyes."

It is anticipated that, after the layer of the urethane coating composition has been applied to the substrate, some or all of the isocyanate groups will react with some or all of the isocyanate-reactive groups, thus forming a cured polyurethane layer. In order to promote this reaction, the layer of the urethane coating composition may be heated. When 80 mole % or more of the isocyanate groups have reacted, the layer of urethane coating composition is said herein to have become a cured polyurethane layer. If the urethane coating composition contains one or more solvent, preferably, after the layer of the urethane coating composition has been applied to the substrate, the solvent is forced to or is allowed to evaporate from the coating composition. When the layer of the urethane coating composition is heated, it is contemplated that the act of heating the layer of the urethane coating composition on the substrate will serve to promote the evaporation of solvent as well as promote the cure reaction.

Preferably, the average thickness of the cured polyurethane layer is 0.5 micrometer or more; more preferably 1 micrometer or more. Preferably, the average thickness of the cured polyurethane layer is 10 micrometers or less; more preferably 7.5 micrometers or less; more preferably 5 micrometers or less.

The substrate is a printed surface. Preferably, within the area of the substrate that is covered by the layer of the urethane coating composition, the portion of the substrate that is covered by ink is 10% or greater; more preferably 20% or greater; more preferably 50% or more. Preferably, within the area of the substrate that is covered by the layer of the urethane coating composition, the portion of the substrate that is covered by ink is 100% or less.

On the printed surface, the ink is dry. The amount of olefin copolymer in the ink, by weight based on the weight of the ink, is 1% or more; more preferably 5% or more; more preferably 10% or more. The amount of ethylene-acrylic copolymer in the ink, by weight based on the weight of the ink, is 99% or less; more preferably 95% or less; more preferably 90% or less.

The ink contains one or more conductivity additives. The amount of conductivity additive in the ink, by weight based on the weight of the dry ink, is preferably 0.5% or more; more preferably 1% or more; more preferably 1.5% or more. The amount of conductivity additive in the ink, by weight based on the weight of the dry ink, is preferably 15% or less; more preferably 10% or less; more preferably 5% or less.

The substrate preferably has thickness of 20 to 200 micrometers. The substrate preferably comprises one or more polymer; preferably the amount of polymer in the substrate is 50% or more; more preferably 75% or more; more preferably 90% or more. The substrate may be a single layer of polymer, or the substrate may be made of multiple layers of polymer. When the substrate has multiple layers, any one layer may have the same composition as one or more of the other layers, or that one layer may have a composition that is different from all of the other layers. Any one layer may optionally contain one or more impact modifiers or other additives. Compounds may optionally be present between layers, for example to act as tie layers and/or barrier layers.

The layer of the substrate that is in contact with printing ink and with the urethane coating composition of the present invention is known herein as the "top" layer of the substrate. Preferably the top layer of the substrate contains one or more polyolefin or one or more polyester or a combination thereof. Preferably the amount of polyolefin in the top layer of the substrate is, by weight, 50% or more; more preferably 75% or more; more preferably 90% or more. Suitable polyolefins include, for example, polypropylene, polyethylene, and mixtures thereof. Suitable forms of polyethylene are, for example, linear polyethylene homopolymer (HDPE), linear low density polyethylene, homopolymer, medium density linear polyethylene homopolymer, low density polyethylene homopolymer, and blends of two or more thereof. Suitable polyesters include, for example, polyethylene terephthalate.

It is expected that the cured polyurethane layer will be durable. That is, it is expected that the cured polyurethane layer will resist degradation due to one or more of the following stress factors: scratching, exposure to aggressive chemicals, crumpling, and heat.

It is contemplated that printed substrates, if not protected somehow (for example by a durable coating or by an additional laminated layer), are very vulnerable to any of the above-mentioned stress factors. In particular, the printing ink would suffer degradation of appearance and/or adhesion to the substrate when exposed to any of the stress factors. In the past, to protect the printed surface, it was common to attach a layer of an additional polymer on top of the printed surface (ie, laminate an additional polymer layer onto the printed surface). Common additional polymers were polyethylene terephthalate and biaxially oriented polypropylene. Commonly, the thickness of the layer of additional polymer was 8 to 25 micrometers.

In contrast to the previous practice of laminating an additional polymer layer, in the practice of the present invention, the cured polyurethane layer provides a durable surface, and the lamination of an additional polymer layer is not needed. Preferably, after the printed surface has been coated by the practice of the present invention, no additional layers of polymer are laminated to the coated printed surface.

An object having a coated, printed surface of the present invention may be used for any purpose. Suitable purposes include, for example, using an object having a coated, printed surface of the present invention as part of a pouch or other package, for example to contain food. Other purposes include, for example, home and personal care product packages, protective films, printed liners, and labels. Preferably, when an object having a coated, printed surface of the present invention is used for any purpose, no additional layers of polymer are laminated to the coated, printed surface.

The following are examples of the present invention. Operations were performed at room temperature (approximately 23° C.) except where otherwise stated.

The following test methods were used. (ASTM refers to the American Society of Testing and Materials, Conshohocken, PA, USA).

Wetting of the liquid coating composition over the printed substrate was assessed visually. The more smooth and uniform the layer of liquid coating composition, the better the wettability was rated. Ridges and valleys were considered evidence of lack of uniformity in the layer of liquid coating composition.

Scratch Resistance was assessed by ASTM D7027-05. Temperature Resistance was tested by ASTM 1921. Gloss was assessed by ASTM D2457.

Chemical resistance was assessed with the following test. 1 ml of a simulant liquid was placed directly over the coated ink on a printed film. At 0.5 hour, 4 hours, and 24 hours, the printed film was subjected to five cycles of crumpling and flattening by hand. The film was then rated as follows:

Good: Ink and coating remained on the surface without change

Fair: portions of ink and varnish were removed randomly from the film surface

Bad: ink and coating were discolored and removed completely from the film surface Temperature resistance was assessed by a method based on ASTM 1921 and ASTM D2457. The test result is the lowest temperature at which the sample begins to show obvious damage such as, for example dramatic contraction or film burn.

Various printing inks were used to form multi-color printed images. The approximate composition of the inks, prior to drying, is believed to be as follows (percentages by weight based on the weight of the printing ink):

less than 80% petroleum hydrocarbon
less than 15% olefin copolymer
approximately 2.5% conductivity additive
approximately 3.5% dyes and pigments The substrate used in the tests was as follows. The symbol "μm" refers to micrometer. Percentages are by weight based on the weight of the layer. "PA" is polyamide. Polyamide may be coextruded with polyethylene and/or maleic anhydride modified polyethylene. I2 is Melt Index measured at 90° C. using 2.16 kg, reported in units of grams per 10 minutes. D is density, in grams per cubic centimeter.

| Layer | Thickness (μm) | Product |
|---|---|---|
| A (top) | 30 | Linear Low Density Polyethylene (LLDPE) I2 = 0.85, D = 0.918 |
| B | 20 | Maleic Anhydride Modifed Polyethylene I2 = 2.0, D = 0.950 |
| C | 10 | PA |
| D | 20 | Maleic Anhydride Modifed Polyethylene I2 = 2.0, D = 0.950 |
| E | 20 | Linear Low Density Polyethylene (LLDPE) I2 = 0.85, D = 0.918 |

The following coating composition Examples of the present invention were used.

Component A of Example 1

| Ingredient | Description | Amount (wt. %) |
|---|---|---|
| Ethyl acetate | Solvent from UNIVAR, Inc. | 24.049 |
| Trimethylolpropane | from Lanxess Corp, functionality = 3 | 11.480 |
| monomeric toluene diisocyanate (TDI) | Mondur TD-80 Grade B from Covestro | 43.612 |
| Wax Ester | Synaceti 125 from Werner G. Smith, Inc. | 1.191 |
| Corn oil | Fatty triglyceride, refined corn oil from Cargill Inc. | 1.191 |
| cyclohexane | Cyclohexane from UNIVAR, Inc. | 18.423 |
| benzoyl chloride | benzoyl chloride from Aldrich Chemical Co. | 0.055 |

To prepare Composition A of example 1, the wax ester and the trimethylolpropane were loaded to the reactor followed by ethyl acetate. The TDI was vacuum loaded to the reactor followed by the remainder of the ethyl acetate as a rinse. The batch was held at 70° C. for 3 hours. The batch was then cooled to 55° C. The viscosity of the batch was measured. If the viscosity was less than 380 mPa*s (380 cP), the viscosity of the batch was adjusted to 380 mPa*s (380 cP) by adding trimethylolpropane. If the viscosity was greater than 380 mPa*s (380 cP), or after the additional trimethylolpropane was added, the reactor was then cooled to 55° C. The corn oil was vacuum loaded to the reactor. The cyclohexane was then added to the reactor, and the contents were held at 45° C. and stirred 45 minutes until the contents became clear. The benzoyl chloride was then vacuum loaded to the reactor, and the contents were stirred for 15 minutes. Reactant Composition A was then packaged for use.

Component A of Example 2

| Ingredient | Description | Amount (wt. %) |
| --- | --- | --- |
| Ethyl acetate | Solvent from UNIVAR, Inc. | 24.049 |
| Trimethylolpropane | Trimethylolpropane from Lanxess Corp, MW = 134; functionality = 3 | 6.471 |
| Methylene diphenyl diisocyanate | ISONATE 125M from Dow Chemical Company | 48.62 |
| Wax Ester | Synaceti 125 from Werner G. Smith, Inc. | 1.191 |
| Corn oil | Fatty triglyceride, refined corn oil from Cargill Inc. | 1.191 |
| cyclohexane | Cyclohexane from UNIVAR, Inc. | 18.423 |
| benzoyl chloride | benzoyl chloride from Aldrich Chemical Co. | 0.055 |

To prepare Composition A of example 2, the wax ester and the trimethylolpropane were loaded to the reactor followed by ethyl acetate. The MDI was vacuum loaded to the reactor followed by the remainder of the ethyl acetate as a rinse. The batch was held at 70° C. for 3 hours. The batch was then cooled to 55° C. The corn oil was vacuum loaded to the reactor. The cyclohexane was then added to the reactor, and the contents were held at 45° C. and stirred 45 minutes until the contents became clear. The benzoyl chloride was then vacuum loaded to the reactor, and the contents were stirred for 15 minutes. Reactant Composition A was then packaged for use.

Component B of Example 1

| Ingredient | Description | Amount (wt. %) |
| --- | --- | --- |
| ethyl acetate | Solvent from UNIVAR, Inc. | 26.5861 |
| Triisopropylanolamine (TIPA) | polyol from The Dow Chemical Company; MW = 191; functionality: 3 | 20.2901 |
| monomeric toluene diisocyanate (TDI) | Mondur TD-80 Grade B from Covestro | 17.8299 |
| Voranol ™ 220-260 | polyether diol (nominal molecular weight of 425), functionality = 2, OHN = 260 from The Dow Chemical Company | 13.8618 |
| Voranol ™ 220-110N | Polyether polyol, MW = 1000; Functionality: 2; OHN = 110 from The Dow Chemical Company | 21.4276 |
| SAG-47 | Anti foam from Momentive Performance Materials | 0.0046 |

To prepare Reactant Composition B of example 1, the TIPA was melted. The Voranol 220-260 was vacuum loaded into a reactor. The melted TIPA was vacuum loaded into the reactor, followed by the VORANOL 220-110N. The vacuum lines were rinsed with ethyl acetate and the contents of the reactor were stirred at 75 RPM. Ethyl acetate was vacuum loaded into the reactor. The contents of the reactor were cooled via a cooling jacket. After cooling, the TDI was loaded to the reactor, and the vacuum lines were rinsed with ethyl acetate. Because of the exothermic nature of the reaction, the contents of the reactor were cooled to a temperature of 75° C. The temperature in the reactor was held at 75° C. under agitation for 4 hours. The contents of the reactor were then cooled to 60° C., a mixture of the antifoam and the remaining ethyl acetate were vacuum loaded to the reactor. The contents were then stirred for 30 minutes. The reactor was then cooled to 50° C., and the Reactant Composition B was packaged for use.

Component B of Example 2

| Ingredient | Description | Amount (wt. %) |
|---|---|---|
| ethyl acetate | Solvent from UNIVAR, Inc. | 34.196 |
| Triisopropylanolamine (TIPA) | Polyol from The Dow Chemical Company; MW = 191; functionality: 3 | 17.644 |
| Monomeric toluene diisocyanate (TDI) | Mondur TD-80 Grade B from Covestro | 15.505 |
| Voranol ™ 220-260 | polyether diol (nominal molecular weight of 425), functionality = 2, OHN = 260 from The Dow Chemical Company | 12.054 |
| Voranol ™ 220-110N | Polyether polyol, MW = 1000; Functionality: 2; OHN = 110 from The Dow Chemical Company | 18.633 |
| SAG-47 | Anti foam from Momentive Performance Materials | 0.004 |
| CAB-381-0.5 | Cellulose acetate butyrate, anti block agents from Eastman Chemical Company | 1.121 |
| CAB-551-0.01 | Cellulose acetate butyrate, anti block agents from Eastman Chemical Company | 0.280 |
| Modaflow | wetting, leveling agent, acrylic polymer from Allnex | 0.561 |

To prepare Reactant Composition B of example 2, the TIPA was melted. The Voranol 220-260 was vacuum loaded into a reactor. The melted TIPA was vacuum loaded into the reactor, followed by the VORANOL 220-110N. The vacuum lines were rinsed with ethyl acetate and the contents of the reactor were stirred at 75 RPM. Ethyl acetate was vacuum loaded into the reactor. The contents of the reactor were cooled via a cooling jacket. After cooling, the TDI was loaded to the reactor, and the vacuum lines were rinsed with ethyl acetate. Because of the exothermic nature of the reaction, the contents of the reactor were cooled to a temperature of 75° C. The temperature in the reactor was held at 75° C. under agitation for 4 hours. The contents of the reactor were then cooled to 60° C., a mixture of the antifoam, cellulose acetate butyrate, modaflow, and the remaining ethyl acetate were vacuum loaded to the reactor. The contents were then stirred for 60 minutes at 60° C. The reactor was then cooled to 50° C., and the Reactant Composition B was packaged for use.

The following Comparative Examples were used.

| Comparative Example | Product | Supplier | Comment |
|---|---|---|---|
| C3 | 1K OPV Flexo coating | Siegwerk | Single-component polyurethane |
| C4 | SQ 2K gloss coating | Sun Chemical | Two-component polyurethane |
| C5 | UV curing varnish 002 | Sericol | believed to be acrylic |

In the scratch resistance test, an area of the substrate was printed with a uniform block of a printing ink of a single color, and that printed area was tested. The result is the number of scratching cycles performed before the surface of the sample shows any visible damage. The test was stopped at 50 cycles, even though the best samples showed no damage at that time. The results were as follows:

| Example | Number of Scratch Cycles Before Damage |
|---|---|
| 1 | 50 |
| 2 | 50 |
| C3 | 30 |
| C4 | 45 |
| C5 | 20 |

The examples of the present invention showed better scratch resistance than all the comparative examples.

In the Chemical Resistance Test, three different chemical reagents were used:

"Cl"=a liquid chlorine-containing disinfectant solution

"Cl/det"=the same solution as in "Cl", with detergent added

"liq"=a commercial liquid all-purpose household cleaning solution

Three different standing times were used: 0.5 h (hour), 4 h, and 24 h.

The results were as follows:

| Example | Cl 0.5 h | Cl 4 h | Cl 24 h | Cl/det 0.5 h | Cl/det 4 h | Cl/det 24 h | liq 0.5 h | liq 4 h | liq 24 h |
|---|---|---|---|---|---|---|---|---|---|
| 1 | good | good | good | good | good | good | good | good | good |
| 2 | good | good | good | good | good | good | good | good | good |
| C3 | good | bad | bad | good | bad | bad | good | bad | bad |
| C4 | good | bad | bad | good | bad | bad | good | bad | bad |
| C5 | good | fair | bad | good | fair | bad | good | fair | bad |

At 0.5 hours, all the examples showed good performance. At 4 hours and 24 hours, the examples of the present invention showed better chemical resistance than all the comparative examples.

The temperature resistance test was performed as described above. The results were as follows:

| Example | Temperature (° C.) |
|---|---|
| 1 | 175 |
| 2 | 175 |
| C3 | 125 |
| C4 | 155 |
| C5 | 135 |
| uncoated printed film | 75 |

The examples of the present invention showed better temperature resistance than all the comparative examples. The uncoated film showed damage at 75° C.; the comparative examples C3, C4, and C5 showed damage 125° C. to 155° C., while the invention examples did not show damage until 175° C.

In the gloss test, the result is the gloss observed at a 60 degree angle. The results were as follows:

| Example | Gloss (%) |
|---|---|
| 1 | 77 |
| 2 | 82 |
| C3 | 58 |
| C4 | 72 |
| C5 | 65 |
| uncoated printed film | 41 |

The examples of the present invention showed better gloss than all the comparative examples.

The invention claimed is:

1. A process for producing a coated, printed substrate comprising:
   (a) providing a printed substrate, wherein the substrate comprises a surface on which resides one or more areas of a layer of an ink, wherein the ink consists of
      (i) one or more olefin copolymers, and
      (ii) one or more appearance additive selected from one or more pigments, one or more dyes, and mixtures thereof, and
      (iii) one or more conductivity additives,
   (b) bringing together a component A and a component B to form a urethane coating composition,
      wherein component A comprises a polyisocyanate prepolymer A1, wherein the polyisocyanate prepolymer A1 is a reaction product of a polyisocyanate monomer A1a and an isocyanate-polyreactive compound A1b,
      wherein component B comprises one or more polyol B1,
      wherein the urethane coating composition has isocyanate index greater than 0.9, and
   (c) applying a layer of the urethane coating composition to the surface.

2. The process of claim 1, wherein the polyol B1 comprises one or more polyurethane polyol B1PU, wherein polyol B1PU comprises a reaction product of a polyisocyanate monomer B1PUa and a polyol B1PUb.

3. The process of claim 1, wherein the olefin copolymer is selected from the group consisting of ethylene/acrylic copolymers, ethylene/ester copolymers, ethylene carbonyl copolymers, and mixtures thereof.

4. The process of claim 1, wherein component A comprises one or more fatty triglyceride.

5. The process of claim 1, wherein component A comprises one or more wax ester.

6. The process of claim 1, wherein component B additionally comprises one or more anti-block agents.

7. The process of claim 1, wherein component B additionally comprises one or more wetting agents.

8. The process of claim 1, wherein the substrate comprises polyethylene.

9. The process of claim 1, wherein the isocyanate-polyreactive compound A1b comprises one or more polyether polyol, one or more polyester polyol, or a mixture thereof.

10. The process of claim 1, wherein the urethane coating composition has isocyanate index of 0.9 to 1.6.

11. The process of claim 1 wherein the olefin copolymer is an ethylene-acrylic copolymer.

12. The process of claim 1 wherein the ink consists of
   (i) from 10 wt % to 90 wt % of the one or more olefin copolymers,
   (ii) the one or more appearance additive selected from one or more pigments, one or more dyes, and mixtures thereof, and
   from 1.5 wt % to 15 wt % of one or more conductivity additives, and weight percent is based on the total dry weight of the ink.

13. The process of claim 12 wherein the olefin copolymer is selected from the group consisting of ethylene/acrylic copolymers, ethylene/ester copolymers, ethylene carbonyl copolymers, and mixtures thereof.

14. The process of claim 12 wherein the olefin copolymer is an ethylene-acrylic copolymer.

* * * * *